US010533906B2

(12) United States Patent
Chen et al.

(10) Patent No.: US 10,533,906 B2
(45) Date of Patent: Jan. 14, 2020

(54) PRESSURE SENSING ARRAY AND PRESSURE SENSING METHOD

(71) Applicant: AU Optronics Corporation, Hsin-Chu (TW)

(72) Inventors: Chi-Cheng Chen, Hsin-Chu (TW); Gui-Wen Liu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 159 days.

(21) Appl. No.: 15/659,944

(22) Filed: Jul. 26, 2017

(65) Prior Publication Data

US 2018/0080838 A1 Mar. 22, 2018

(30) Foreign Application Priority Data

Sep. 20, 2016 (TW) .............................. 105130321 A

(51) Int. Cl.
*G01L 1/14* (2006.01)
*G06F 3/044* (2006.01)
*G06F 3/041* (2006.01)

(52) U.S. Cl.
CPC .............. *G01L 1/146* (2013.01); *G06F 3/044* (2013.01); *G06F 3/0412* (2013.01); *G06F 3/0416* (2013.01); *G06F 2203/04105* (2013.01)

(58) Field of Classification Search
CPC ......... G01L 1/146; G01L 1/142; G01L 1/205; G01L 5/228; G06F 3/0414; G01D 5/2405; G01D 5/2417; H01L 29/84
USPC ......................................................... 345/173
See application file for complete search history.

(56) References Cited

U.S. PATENT DOCUMENTS

| 6,145,384 | A  | * | 11/2000 | Ikeda ................... G01D 5/2417 73/780 |
| 6,374,681 | B1 | * | 4/2002 | Vanuytven ........... G01D 5/2405 73/862.046 |
| 6,640,642 | B1 | * | 11/2003 | Onose ..................... G01L 1/146 73/718 |
| 7,944,008 | B2 | * | 5/2011 | Parks ...................... G01L 5/228 257/417 |

(Continued)

FOREIGN PATENT DOCUMENTS

| CN | 101526708 A | 9/2009 |
| CN | 105549790 A | 5/2016 |
| CN | 106484191 A | 3/2017 |

OTHER PUBLICATIONS

Taiwan Intellectual Property Office, "Office Action" dated Nov. 9, 2017, Taiwan.

(Continued)

*Primary Examiner* — Fred Tzeng
(74) *Attorney, Agent, or Firm* — WPAT, PC

(57) ABSTRACT

A pressure sensing array includes a plurality of pressure sensing units and a control unit. Each of the pressure sensing units includes a plurality of first electrode blocks and a plurality of second electrode blocks. The second electrode blocks are arranged in a staggered manner along a first direction or a second direction, in which the first direction is substantially perpendicular to the second direction. The control unit is coupled to the pressure sensing units and used for controlling the first electrode blocks and the second electrode blocks of the each of the pressure sensing units to be turned on or off respectively.

15 Claims, 5 Drawing Sheets

(56) References Cited

U.S. PATENT DOCUMENTS

| | | | |
|---|---|---|---|
| 9,112,058 B2* | 8/2015 | Bao | H01L 29/84 |
| 2004/0046574 A1* | 3/2004 | Chou | G01L 1/146 |
| | | | 324/658 |
| 2005/0199969 A1* | 9/2005 | Kobayashi | G01L 1/146 |
| | | | 257/414 |
| 2009/0033341 A1* | 2/2009 | Son | G01L 1/146 |
| | | | 324/663 |
| 2010/0162832 A1* | 7/2010 | Brauers | A61B 5/103 |
| | | | 73/862.626 |
| 2010/0171718 A1 | 7/2010 | Denda | |
| 2011/0108936 A1* | 5/2011 | Meng | G01L 1/005 |
| | | | 257/419 |
| 2011/0320171 A1* | 12/2011 | Okayama | B01D 46/0086 |
| | | | 702/183 |
| 2012/0038595 A1 | 2/2012 | Park et al. | |
| 2012/0062245 A1* | 3/2012 | Bao | H01L 29/84 |
| | | | 324/661 |
| 2012/0222496 A1* | 9/2012 | Mamigonians | G01L 1/142 |
| | | | 73/862.68 |
| 2013/0020573 A1* | 1/2013 | Fukuyama | G01L 1/146 |
| | | | 257/53 |
| 2014/0104184 A1* | 4/2014 | Meador | G02B 26/001 |
| | | | 345/173 |
| 2015/0002754 A1 | 1/2015 | Kim | |
| 2015/0020610 A1* | 1/2015 | Hurst | G01L 1/146 |
| | | | 73/862.68 |
| 2015/0042614 A1 | 2/2015 | Pak | |
| 2015/0133812 A1* | 5/2015 | deCharms | A61B 5/4824 |
| | | | 600/559 |
| 2015/0177909 A1 | 6/2015 | Hoffman et al. | |
| 2016/0033343 A1* | 2/2016 | Park | G01L 1/205 |
| | | | 73/862.046 |
| 2017/0172490 A1* | 6/2017 | Afentakis | A61B 5/447 |
| 2018/0067600 A1* | 3/2018 | Li | G06F 3/0414 |

OTHER PUBLICATIONS

The National Intellectual Property Administration, "Office Action" dated Sep. 14, 2018.

* cited by examiner

PRESSURE SENSING ARRAY AND PRESSURE SENSING METHOD

BACKGROUND

Technical Field

The present disclosure relates to a pressure sensing technology, and in particular, to a pressure sensing array and a pressure sensing method.

Related Art

Recently, unlocking methods of mobile apparatuses include digit unlocking, pattern unlocking, fingerprint unlocking, pupil unlocking, and the like. The digit unlocking and the pattern unlocking are relatively plain methods, but the design difficulty and the costs of the fingerprint unlocking and the pupil unlocking are relatively high. In addition, pressure sensing has become one of the development tendencies of mobile apparatuses. How to design an unlocking method with relatively high security by using the pressure sensing and how to combine a pressure sensing function with a current panel are currently encountered challenges.

SUMMARY

An embodiment of the present disclosure provides a pressure sensing array. The pressure sensing array includes a plurality of pressure sensing units and a control unit. At least one of the pressure sensing units includes a plurality of first electrode blocks and a plurality of second electrode blocks. The second electrode blocks and the first electrode blocks are arranged in a staggered manner along a first direction and a second direction, where the first direction is substantially orthogonal to the second direction. The control unit is coupled to the pressure sensing units and used for controlling the first electrode blocks and the second electrode blocks of the at least one of the pressure sensing units to be turned on or off respectively.

Another embodiment of the present disclosure provides a pressure sensing method, applicable to a pressure sensing array. The pressure sensing array includes a plurality of pressure sensing units and a control unit. At least one of the pressure sensing units includes: a plurality of first electrode blocks and a plurality of second electrode blocks. The second electrode blocks and the first electrode blocks are arranged in a staggered manner along a first direction and a second direction, where the first direction is substantially orthogonal to the second direction. The pressure sensing method includes the following steps: by means of the control unit, in a case in which the pressure sensing array operates in a first mode, recording a first operating state of the first electrode blocks and a second operating state of the second electrode blocks of the at least one of the pressure sensing units; detecting a pressing state of the at least one of the pressure sensing units; and generating a correct signal when the first operating state, the second operating state, and the pressing state satisfy a first default value. At least one of the first operating state and the second operating state of the at least one of the pressure sensing units is turned-on. By means of a system end, the correct signal is read to perform an unlocking action.

In conclusion, the pressure sensing array of the present disclosure may increase complexity and security of a locking application by turning on or turning off different electrode blocks in each pressure sensing unit. In addition, the pressure sensing array of the present disclosure may be integrated with a touch array and include electrode blocks capable of detecting different pressures (for example, second electrode blocks 412 to 442) and electrode blocks capable of detecting whether they are pressed (for example, first electrode blocks 411 to 441 and third electrode blocks 413 to 443), and may switch to suitable electrode blocks and turn on the same for detecting according to different application scenarios.

The following description describes above in detail by means of embodiments, and provides further explanation of the technical solutions of the present disclosure.

BRIEF DESCRIPTION OF THE DRAWINGS

To make the aforementioned and other objectives, features, advantages and embodiments of the present disclosure more comprehensible, the accompanying drawings are described as follows.

DETAILED DESCRIPTION

The following discloses and provides multiple different embodiments or examples used to implement features of the present invention. Numerical symbols and/or letters may be repeatedly used in different examples of the present disclosure, and all these repetitions are for simplification and description, and do not specify relationships between different embodiments and/or configurations in the following discussion.

In the embodiments and the claims, unless an article in the present disclosure is particularly defined, the words "a" and "the" may generally refer to a single form or a plural form. It should be further understood that when "comprise", "include", "have", and similar terms used herein clearly indicate a feature, an area, an integer, a step, an operation, an element, and/or a member, but do not exclude one or more other features, areas, integers, steps, operations, elements, components and/or groups thereof.

When an element is described to be "connected" or "coupled" to another element, the element may be directly connected to or coupled to the another element, or an additional element may exist between the element and the another element. In contrast, when an element is described to be "directly connected" or "directly coupled" to another element, no additional element exists between the element and the other element.

The term "approximately", "about" or "nearly" used herein should usually mean that an error of a value is within 20 percent of a given value or range, or preferably within 10 percent, or more preferably within 5 percent. Unless specifically indicated, a value maintained herein is considered as an approximate value, that is, an error or a range as indicated by the term "approximately", "about" or "nearly".

Figure 1:
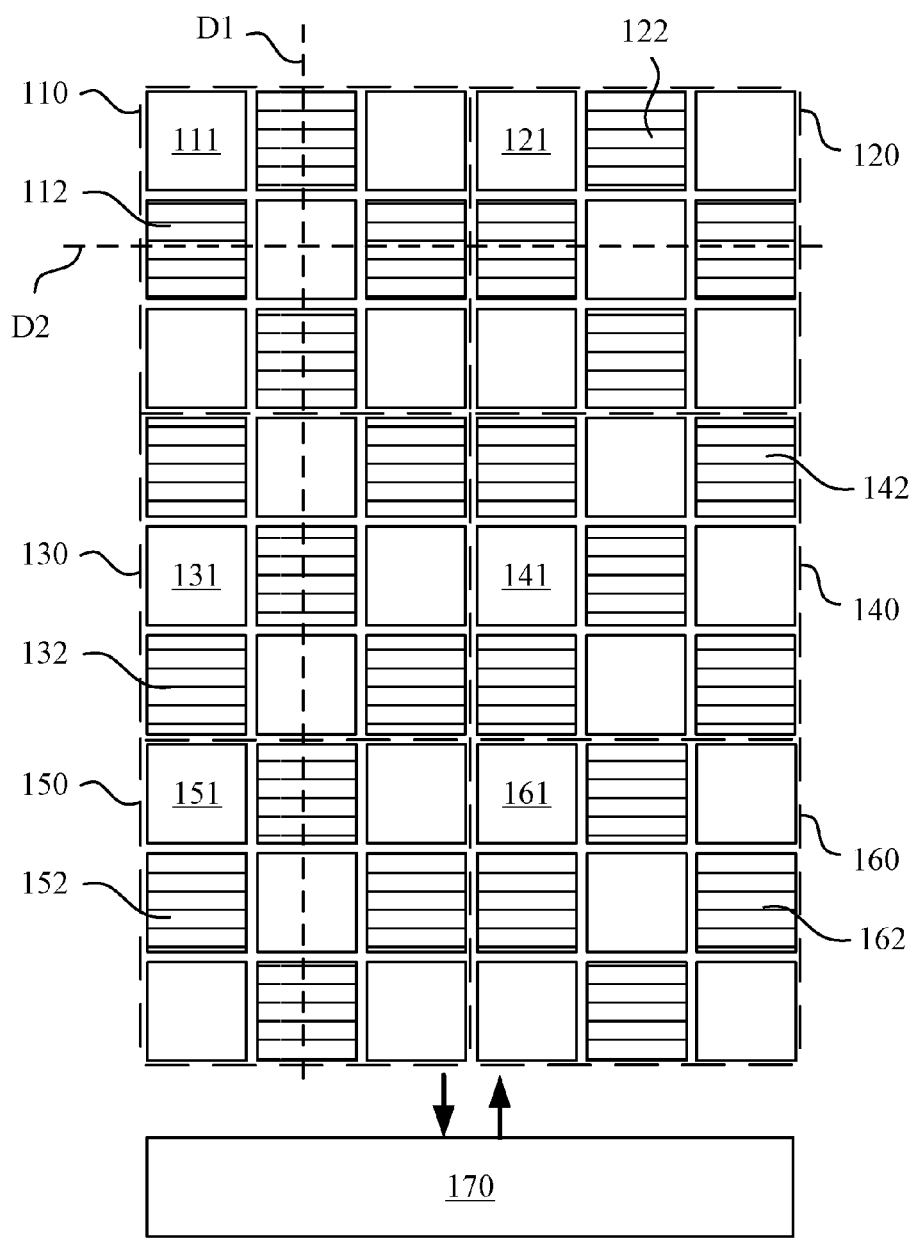
FIG. 1 is a schematic diagram of a pressure sensing array of an embodiment of the present disclosure.

FIG. 1 is a schematic diagram of a pressure sensing array 100 of an embodiment of the present disclosure. The pressure sensing array 100 comprises a plurality of pressure sensing units 110 to 160. At least one of the pressure sensing units 110 to 160 comprises a plurality of first electrode blocks 111 to 161, a plurality of second electrode blocks 112 to 162, and a control unit 170. In this embodiment, the pressure sensing units 110, 120, 150, 160 include five first electrode blocks 111, 121, 151, 161 and four second electrode blocks 112, 122, 152, 162, and the pressure sensing units 130, 140 include four first electrode blocks 131, 141 and five second electrode blocks 132, 142. The second electrode blocks 112 to 162 and the first electrode blocks 111 to 161 are arranged in a staggered manner along a first direction and a second direction. The first direction D1 is substantially orthogonal to the second direction D2. The control unit 170 is coupled to the pressure sensing units 110 to 160 and used for controlling the first electrode blocks 111 to 161 and the second electrode blocks 112 to 162 of the at least one of the pressure sensing units 110 to 160 to be turned on or off respectively.

For example, the control unit 170 may control the first electrode block 111 of the control pressure sensing unit 110 to be turned on, and control the second electrode block 112 of the pressure sensing unit 110 to be turned off. Likewise, the control unit 170 may control the first electrode block 121 and the second electrode block 122 of the control pressure sensing unit 120 to be both turned on. That is, the first electrode blocks and the second electrode blocks in different pressure sensing units 110 to 160 controlled by the control unit 170 may be in different states of on and off.

In an embodiment, in a case in which the pressure sensing array 100 operates in a first mode, the control unit 170 may be further used for recording a first operating state of the first electrode blocks 111 to 161 and a second operating state of the second electrode blocks 112 to 162 of the at least one of the pressure sensing units 110 to 160. For example, the control unit 170 used to record that the operating state is turned-on by using a bit "1" and records that the operating state is turned-off by using a bit "0". However, the embodiment is not used to limit the invention in the present disclosure. On the basis of the content of the foregoing examples, the control unit 170 records a first operating state of the first electrode block 111 in the pressure sensing unit 110 is turned-on by using a bit "1", records a second operating state of the second electrode block 112 in the pressure sensing unit 110 is turned-off by using a bit "0", records that a first operating state of the first electrode block 121 in the pressure sensing unit 120 is turned-on by using a bit "1", and records that a second operating state of the second electrode block 122 in the pressure sensing unit 110 is turned-on by using a bit "1". It should be supplemented that to detect whether each of the pressure sensing units 110 to 160 is pressed, at least one of first electrode blocks and second electrode blocks in each of the pressure sensing units 110 to 160 is turned on (that is, at least one of the first operating state and the second operating state of each of the pressure sensing units 110 to 160 is turned-on).

In addition, the control unit 170 is further used for detecting a pressing state of the at least one of the pressure sensing units 110 to 160. For example, if the pressure sensing unit 110 is pressed and the pressure sensing unit 120 is not pressed, the control unit 170 records that the pressure sensing unit 110 is pressed by using a bit "1" and records that the pressure sensing unit 120 is not pressed by using a bit "0". However, no limitation is imposed in the present disclosure.

In an embodiment, the pressure sensing array 100 may be used for unlocking a lock screen. As shown in FIG. 1, the pressure sensing array 100 includes six pressure sensing units (as marked by dashed lines in FIG. 1). As stated above, a user may respectively control operating states (namely, a first operating state and a second operating state) of the first electrode blocks and the second electrode blocks in each of the pressure sensing units 110 to 160 by means of the control unit 170, and press a particular pressure sensing unit (for example, the pressure sensing unit 110) to determine a press pattern for unlocking. Subsequently, the control unit 170 may record a first operating state, a second operating state, and a pressing state of the at least one of the pressure sensing units 110 to 160 as a default value for unlocking.

For example, as shown in Table 1, the control unit 170 may use a default value "101" with three bits to sequentially record that the first operating state of the first electrode block 111 in the pressure sensing unit 110 is turned-on, the second operating state of the second electrode block 112 in the pressure sensing unit 110 is turned-off, and the pressure sensing unit 110 is pressed. However, no limitation is imposed in the present disclosure. By analogy, the control unit 170 records default values (namely, first default values) of all of the pressure sensing units 110 to 160 as a condition for unlocking.

TABLE 1

| First electrode block | Second electrode block | Whether a turned-on electrode block is pressed | Default value |
| --- | --- | --- | --- |
| Turned-on | Turned-on | Yes | 111 |
| Turned-on | Turned-on | No | 110 |
| Turned-on | Turned-off | Yes | 101 |
| Turned-on | Turned-off | No | 100 |
| Turned-off | Turned-on | Yes | 011 |
| Turned-off | Turned-on | No | 010 |

When a first operating state, a second operating state, and a pressing state of the at least one of the pressure sensing units 110 to 160 satisfy a first default value (for example, by means of setting by a user), the control unit 170 generates a correct signal. In an embodiment, the correct signal may be used for releasing a locked state of an electronic apparatus having the pressure sensing array 100.

In this way, in addition to a pressing state of each of the pressure sensing units 110 to 160 in the pressure sensing array 100, the control unit 170 may further record operating states of the first electrode blocks and the second electrode blocks in each of the pressure sensing units 110 to 160 as a determining condition for releasing a locked state. Therefore, the pressure sensing array of the present disclosure may provide a more complex unlocking method, so as to effectively improve security of the electronic apparatus to which the pressure sensing array 100 is applied.

Figure 2:
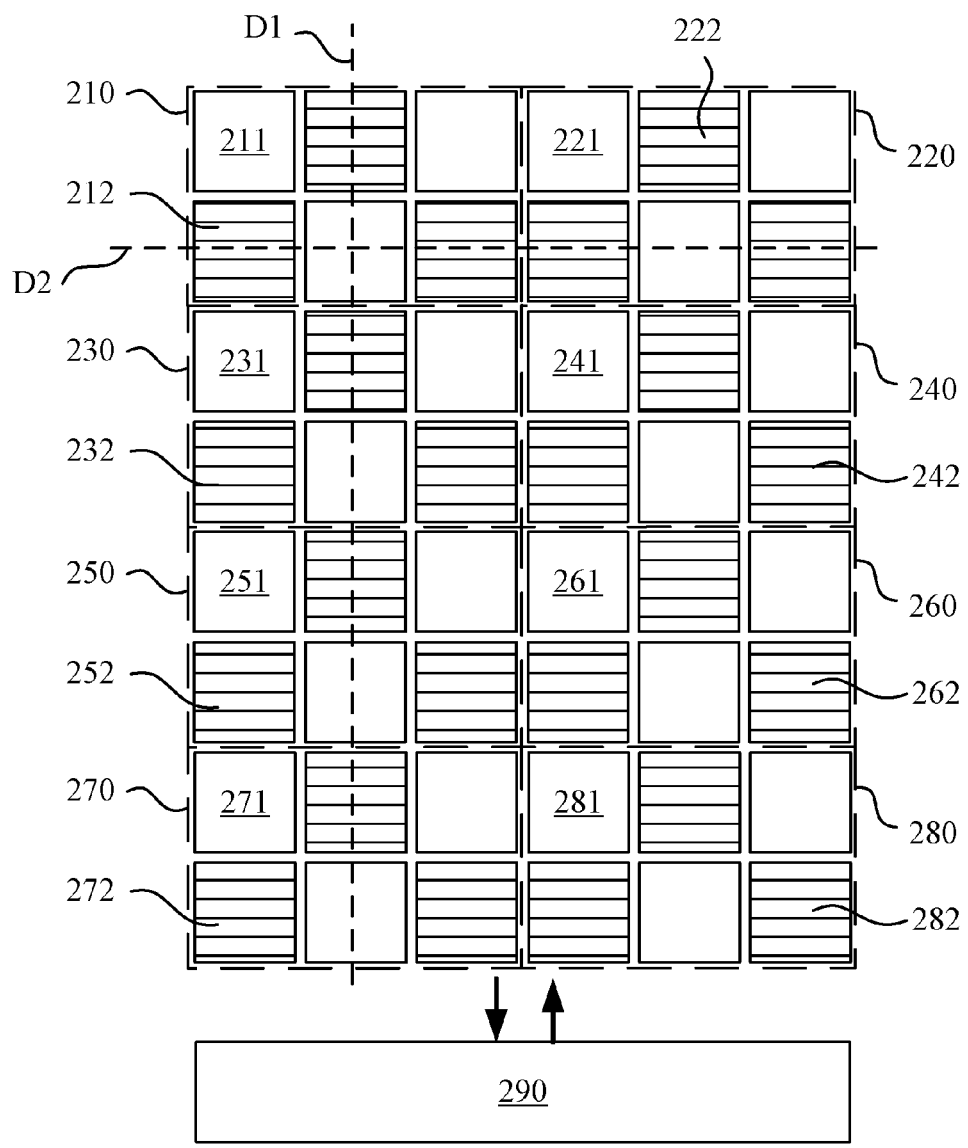
FIG. 2 is a schematic diagram of a pressure sensing array of an embodiment of the present disclosure.

Alternatively, in another embodiment, the pressure sensing units of the pressure sensing array may include different quantities of electrode blocks. FIG. 2 is a schematic diagram of a pressure sensing array 200 of an embodiment of the present disclosure. The pressure sensing array 200 includes a plurality of pressure sensing units 210 to 280. At least one of the pressure sensing units 210 to 280 includes: a plurality of first electrode blocks 211 to 281, a plurality of second electrode blocks 212 to 282, and a control unit 290. In this embodiment, each of the pressure sensing units 210 to 280 includes three first electrode blocks 211 to 281 and three second electrode blocks 212 to 282.

Likewise, a user may respectively control operating states (namely, a first operating state and a second operating state) of the first electrode blocks and the second electrode blocks in each of the pressure sensing units 210 to 280 by means of the control unit 290, and press a particular pressure sensing unit (for example, the pressure sensing unit 210) to determine a press pattern for unlocking. Subsequently, the control unit 290 may record a first operating state, a second operating state, and a pressing state of at least one of the pressure sensing units 210 to 280 as a default value for unlocking.

As compared with the pressure sensing units 110 to 160 in the pressure sensing array 100, the pressure sensing units 210 to 280 in the pressure sensing array 200 have a smaller area and a greater quantity, so that a more complex unlocking method is provided, and the security of the electronic apparatus to which the pressure sensing array 200 is applied is improved.

Figure 3:
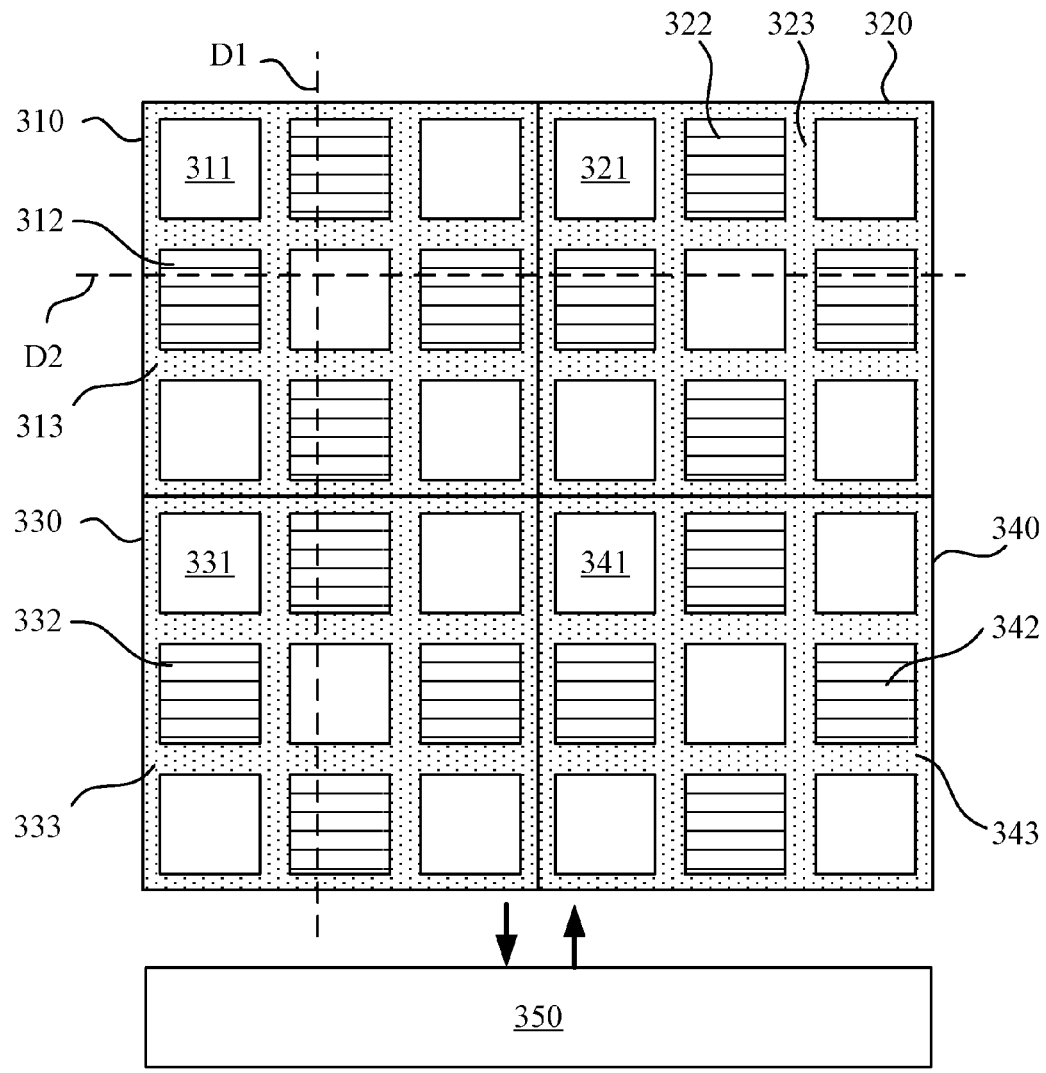
FIG. 3 is a schematic diagram of a pressure sensing array of an embodiment of the present disclosure.

In the present disclosure, complexity of an unlocking method may also be increased by increasing a quantity of electrode blocks in a pressure sensing unit. FIG. 3 is a schematic diagram of a pressure sensing array 300 of an embodiment of the present disclosure. Except for third electrode blocks 313 to 343, the pressure sensing array 300 is approximately the same as the pressure sensing array 100. The third electrode blocks 313 to 343 surround second electrode blocks 312 to 342 and are used for isolating first electrode blocks 311 to 341 from the second electrode blocks 312 to 342. A control unit is further used for controlling the third electrode blocks 313 to 343 of at least one of the pressure sensing units 310 to 340 to be turned on or off. It should be supplemented that at least one of a first operating state, a second operating state, and a third operating state of the at least one of the pressure sensing units 310 to 340 is turned-on to detect whether the at least one of the pressure sensing units 310 to 340 is pressed.

Likewise, in a case in which the pressure sensing array 300 operates in a second mode, the control unit 350 is further used for recording a first operating state of the first electrode blocks 311 to 341, a second operating state of the second electrode blocks 312 to 342, and a third operating state of the third electrode blocks 310 to 340 of the at least one of the pressure sensing units 310 to 340. In addition, the control unit 350 is further used for detecting a pressing state of the at least one of the pressure sensing units 310 to 340.

For example, the control unit 350 may use a default value "1011" with four bits to sequentially record that the first operating state of the first electrode block 311 in the pressure sensing unit 310 is turned-on, the second operating state of the second electrode block 312 is turned-off, the third operating state of the third electrode block 313 is turned-on, and the pressure sensing unit 110 is pressed. By analogy, the control unit 350 records default values (namely, second default values) of all of the pressure sensing units 310 to 340 as a condition for unlocking.

When a first operating state, a second operating state, a third operating state, and a pressing state of at least one of the pressure sensing units 310 to 340 satisfy a second default value (for example, by means of setting by a user), the control unit 350 generates a correct signal. In an embodiment, an electronic apparatus to which the pressure sensing array 300 is applied may read the correct signal to release a locked state by using the correct signal.

In this way, operating states of the first electrode blocks, the second electrode blocks, and the third electrode block in each of the pressure sensing units 310 to 340 serve as a determining condition for locking. Therefore, the pressure sensing array 300 may provide a more complex unlocking method, and further improve security of an electronic apparatus to which the pressure sensing array 300 is applied.

Figure 4:
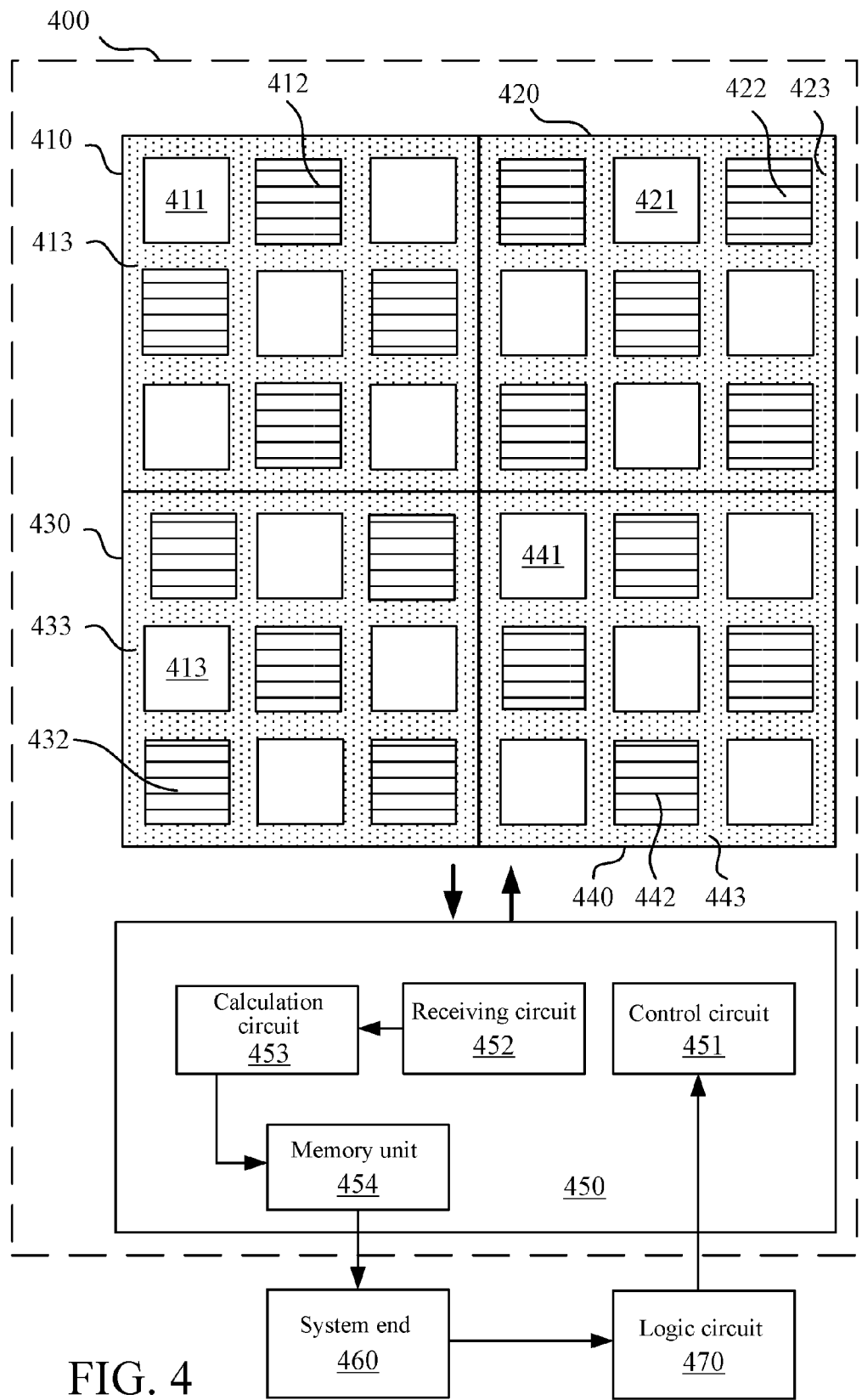
FIG. 4 is a schematic diagram of a pressure sensing array of an embodiment of the present disclosure.

The pressure sensing array in the present disclosure may be integrated with a touch array (for example, an in-cell touch array), referring to FIG. 4. FIG. 4 is a schematic diagram of a pressure sensing array 400 of an embodiment of the present disclosure. The pressure sensing array 400 is proximately the same as the pressure sensing array 300, excerpt for that a control unit 450 includes a control circuit 451, a receiving circuit 452, a calculation circuit 453 (for example, a micro-controller unit (MCU)), and a memory unit 454. The control circuit 451 and the receiving circuit 452 are both coupled to pressure sensing units 410 to 440, the calculation circuit 453 is coupled to the receiving circuit 452, and the memory unit 454 is coupled to the calculation circuit 453. It should be noted that, second electrode blocks 412 to 442 of the sensing units 410 to 440 are all electrode blocks independent of each other, that is, the second electrode blocks 412 to 442 are electrically isolated from each other.

In a use scenario, a system end 460 of an electronic apparatus to which the foregoing pressure sensing array 400 is applied generates a system signal and transmits it to a logic circuit 470 (for example, by means of a serial peripheral interface (SPI), an inter-integrated circuit (IIC) bus, or other interfaces), and the logic circuit 470 receives the system signal, converts the system signal into a logic signal, and subsequently, transmits the logic signal to the control circuit 451. The control circuit 451 receives the logic signal to control the first electrode blocks 411 to 441, the second electrode blocks 412 to 442, and the third electrode blocks 413 to 443 in each of the pressure sensing units 410 to 440 to be turned on or off. As stated above, at least one of a first operating state, a second operating state, and a third operating state of the at least one of the pressure sensing units 410 to 440 is turned-on. That is, at least one of the first electrode blocks, the second electrode blocks, and the third electrode blocks of the at least one of the pressure sensing units 410 to 440 is turned-on.

For example, in a scenario in which the electronic apparatus executes an pressing function application program, the system end 460 generates a corresponding system signal, a logic signal converted by the logic circuit 470 is "10", and the control circuit 451 controls, according to the logic signal "10", the second electrode blocks 412 to 442 of each of the pressure sensing units 410 to 440 to be turned on (that is, the second operating state is turned-on) to detect a plurality of pressing stages of the second electrode blocks 412 to 442. In a scenario in which a user operates the electronic apparatus (for example, answering a call) while wearing a glove or performs photographing in water, a logic signal converted by the logic circuit 470 is "11", and the control circuit 451 controls, according to the logic signal "11", the third electrode block 413 to 443 of each of the pressure sensing units 410 to 440 to be turned on (that is, the third operating state is turned-on) to detect whether the third electrode blocks 413 to 443 are pressed. In an identity recognition scenario of a screen unlocking or payment function of the electronic apparatus, the system end 460 transmits a corresponding system signal, a logic signal converted by the logic circuit 470 is "01", and the control circuit 451 controls, according to the logic signal "01", the first electrode blocks 411 to 441 and the third electrode blocks 413 to 443 of each of the pressure sensing units 410 to 440 to be turned on (that is, the first operating state and the third operating state are turned-on) to detect whether the first electrode blocks 411 to 441 and the third electrode blocks 413 to 443 are pressed. However, the present disclosure is not limited to the foregoing embodiments. The control circuit 451 may control, according to a logic signal, at least one of the first electrode blocks 411 to 441, the second electrode blocks 412 to 442, and the third electrode blocks 413 to 443 to be turned on.

In the foregoing different use scenarios, the control circuit 451 correspondingly controls an electrode block in each of the pressure sensing units 410 to 440 to be turned on. When a user performs an operation, the receiving circuit 451 is used for receiving a plurality of sensing signals generated by the first electrode blocks 411 to 441, the second electrode blocks 412 to 442, or the third electrode blocks 413 to 443 that have been turned on in each of the pressure sensing units 410 to 440, and transmitting the sensing signals to the calculation circuit 453. The calculation circuit 453 is used for generating a calculation result signal according to the sensing signals to determine whether each of the pressure sensing units 410 to 440 is pressed, and the calculation circuit 453 temporarily stores the sensing signals in a memory unit 454. The system end 460 is connected to the memory unit 454 (for example, by means of a serial peripheral interface (SPI), an inter-integrated circuit (IIC) bus, or other interfaces) to read the calculation result signal in the memory unit 454 to perform corresponding actions (for example, unlocking, photographing, and answering a call) in different use scenarios.

For example, in a scenario of screen unlocking of the electronic apparatus, when determining that a first operating state, a second operating state, and a pressing state of at least one of the pressure sensing units 410 to 440 satisfy a default value (alternatively, a first operating state, a second operating state, a third operating state, or a pressing state satisfies a second default value), the calculation circuit 453 of the control unit 450 generates a correct signal (that is, a calculation result signal). The system end 460 of the electronic apparatus reads the correct signal to perform an unlocking action.

As shown in FIG. 4, when operating in pressure detection, the pressure sensing units 410 to 440 are not connected to each other. In an example in which the pressure sensing unit 410 senses pressure, the first electrode blocks 411 are conducted with each other during pressure detection, and the second electrode blocks 412 are conducted with each other during pressure detection. It should be supplemented that, when the pressure sensing array 400 operates in a touch mode, the pressure sensing array 400 may perform touch detection by means of a multiplexer (MUX). In addition, when the pressure sensing array 400 operates in a pressure sensing mode and a touch mode (including a self-capacitance touch mode and a mutual-capacitance touch mode), an electrode block coupled to a fixed voltage (for example, VCOM) may be shared therein.

In an embodiment, the total area of the first electrode blocks 411 is greater than the area of the second electrode blocks 412 (the second electrode blocks 412 are electrode blocks independent of each other), and the area of the third electrode blocks 413 is greater than the area of the second electrode blocks 412. The area of the first electrode blocks 411 is the greatest, and therefore the change in capacitance value under a fixed force is relatively great, that is, an upper limit of capacitance detection of the control unit 450 may be reached within a relatively narrow pressure range. In contrast, the area of the second electrode blocks 412 is the smallest, and therefore the change in a capacitance value under a fixed force is relatively small, that is, an upper limit of capacitance detection of the control unit 450 is reached only when a relatively broad pressure range is detected. Therefore, in this embodiment, the first electrode blocks 411 to 441 and the third electrode blocks 413 to 443 are all used for detecting whether the first electrode blocks 411 to 441 and the third electrode blocks 413 to 443 are pressed, and the second electrode blocks 412 to 442 of the pressure sensing units 410 to 440 may be used for detecting a plurality of pressing stages, that is, different pressures.

In practice, the foregoing first electrode blocks 111 to 161, 211 to 281, 311 to 341, 411 to 441, second electrode blocks 112 to 162, 212 to 282, 312 to 342, 412 to 442, and third electrode blocks 313 to 343, 413 to 443 may be implemented by using a conductive material (for example, being manufactured by selecting indium tin oxide (ITO), metal, or an externally bonded thin film). However, no limitation is imposed in the present disclosure. The control units 170, 290, 350, 450 may be control chips integrating touch control and display.

Figure 5:
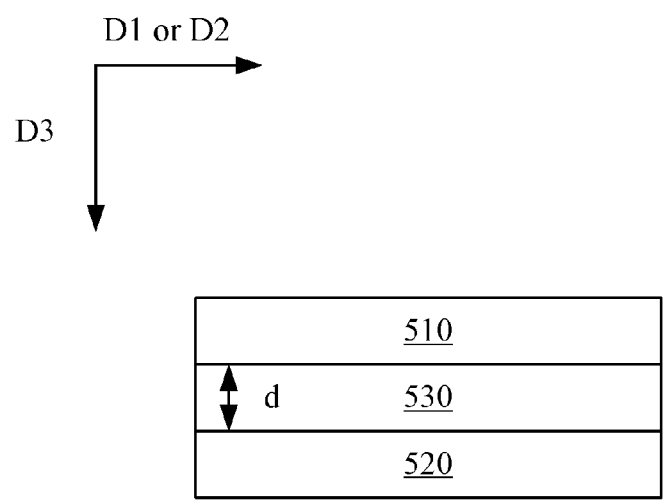
FIG. 5 is a schematic cross section of a pressure sensing unit of an embodiment of the present disclosure.

To describe a structure of a pressure sensing unit, reference may be made to FIG. 5. FIG. 5 is a schematic cross section of a pressure sensing unit of an embodiment of the present disclosure. In an embodiment, the foregoing first electrode blocks 111 to 161, 211 to 281, 311 to 341, 411 to 441, second electrode blocks 112 to 162, 212 to 282, 312 to 342, 412 to 442, and third electrode blocks 313 to 343, 413 to 443 may be actually implemented as an electrode block 510, which is spaced by an medium 530 from another electrode block 520 (which may serve as a reference electrode block in a self-capacitance pressure sensing mode or a transmit electrode block in a mutual-capacitance pressure sensing mode) by a distance d (for example, 200 to 400 millimeters (mm)) along a third direction D3 and remains electrically isolated from the electrode block 520. The third direction D3 is substantially vertical to the first direction D1 and the second direction D2. When an external force is applied to the electrode block 510, the distance d between the electrode block 510 and the electrode block 520 decreases, so that a capacitance value between the electrode block 510 and the electrode block 520 increases. Therefore, the pressure sensing arrays 100, 200, 300, 400 may detect a capacitance value between the electrode block 510 and the electrode block 520 to determine whether the pressure sensing unit is pressed or determine different pressures.

Specifically, in a self-capacitance pressure sensing mode, the electrode block 510 may serve as a sensing electrode for transmission and reception, and the electrode block 520 may serve as a reference electrode (which may be coupled to a ground or a direct current voltage). In a mutual-capacitance pressure sensing mode, the electrode block 510 may serve as a receive electrode block, and the electrode block 520 may serve as a transmit electrode block. Therefore, in the self-capacitance pressure sensing mode or the mutual-capacitance pressure sensing mode, when the electrode blocks 510 and 520 deform upon pressing by an external force, a change appears in an equivalent capacitance value between the electrode blocks 510 and 520. Thus, the change in the equivalent capacitance value can be used for determining whether the pressure sensing unit is pressed or determining different pressures.

Alternatively, in another embodiment, the first electrode blocks 111 to 161, 211 to 281, 311 to 341, 411 to 441, the second electrode blocks 112 to 162, 212 to 282, 312 to 342, 412 to 442, and the third electrode blocks 313 to 343, 413 to 443 may be actually implemented as an electrode block 520, which is spaced by an medium 530 from another electrode block 510 (that is, a common electrode block) by a distance d along a third direction D3 and remains electrically isolated from the electrode block 520. Likewise, when an external force is applied to the electrode block 510, the distance d between the electrode block 510 and the electrode block 520 decreases, so that a capacitance value between the electrode block 510 and the electrode block 520 increases. Therefore, the pressure sensing arrays 100, 200, 300, 400 may detect a capacitance value between the electrode block 510 and the electrode block 520 to determine whether the pressure sensing unit is pressed or determine different pressures. It should be supplemented that the foregoing medium 530 is a medium having a dielectric coefficient (for example, air or a flexible insulation layer). However, no limitation is imposed in the present disclosure.

In conclusion, the pressure sensing array of the present disclosure may increase complexity and security of a locking application by turning on or turning off different electrode blocks in each pressure sensing unit. In addition, the pressure sensing array of the present disclosure may be integrated with a touch array and include electrode blocks capable of detecting different pressures (for example, second electrode blocks 412 to 442) and electrode blocks capable of detecting whether they are pressed (for example, first electrode blocks 411 to 441 and third electrode blocks 413 to 443), and may switch, according to different application scenarios, to suitable electrode blocks and turn on the same for detecting.

Although the present invention is disclosed as above by using multiple embodiments, these embodiments are not used to limit the present invention. Any person skilled in the art may make various changes and modifications without departing from the spirit and scope of the present invention, and therefore the protection scope of the present invention should be subject to the appended claims.

What is claimed is:

1. A pressure sensing array, comprising:
   a plurality of pressure sensing units, wherein at least one of the pressure sensing units comprises:
      a plurality of first electrode blocks; and
      a plurality of second electrode blocks, arranged by staggered with the first electrode blocks along a first axis and a second axis; and
   a control unit, coupled to the pressure sensing units for controlling the first electrode blocks and the second electrode blocks of the at least one of the pressure sensing units;
   wherein when the pressure sensing array operates in a first mode, the control unit further performs recording a first operating state of the first electrode blocks and a second operating state of the second electrode blocks of the at least one of the pressure sensing units, detecting a pressing state of the at least one of the pressure sensing units, and generating a correct signal when the first operating state, the second operating state, and the pressing state satisfy a first default value while one of the first operating state and the second operating state of the at least one of the pressure sensing units is turned on.

2. The pressure sensing array according to claim 1, wherein the at least one of the pressure sensing units further comprises:
   a third electrode block, surrounding the second electrode blocks for isolating the first electrode blocks from the second electrode blocks, wherein the control unit further controls the third electrode block of the at least one of the pressure sensing units.

3. The pressure sensing array according to claim 2, wherein when the pressure sensing array operates in the second mode, the control unit further performs recording the first operating state of the first electrode blocks, the second operating state of the second electrode blocks, and a third operating state of the third electrode block of the at least one of the pressure sensing units, detecting the pressing state of the at least one of the pressure sensing units, and generating the correct signal when the first operating state, the second operating state, the third operating state, and the pressing state satisfy a second set of default values while one of the first operating state, the second operating state, and the third operating state of the at least one of the pressure sensing units is turned on.

4. The pressure sensing array according to claim 2, wherein when the pressure sensing array operates in the third mode, the control unit further receives a logic signal correspondingly turning on the first electrode blocks, the second electrode blocks, or the third electrode block of the at least one of the pressure sensing units, and receives a plurality of sensing signals generated by the first electrode blocks, the second electrode blocks, or the third electrode block after turning on.

5. The pressure sensing array according to claim 4, wherein the control unit comprises:
   a control circuit, coupled to the pressure sensing units for receiving the logic signal from a system end, and correspondingly turning on the first electrode blocks, the second electrode blocks, or the third electrode block of the at least one of the pressure sensing units according to the logic signal;
   a receiving circuit, coupled to the pressure sensing units for receiving the sensing signals generated by the first electrode blocks, the second electrode blocks, or the third electrode block being turned on;
   a calculation circuit, coupled to the receiving circuit for generating a calculation result signal according to the sensing signals; and
   a memory unit, coupled to the calculation circuit for storing the calculation result signal, wherein the system end is used for reading the calculation result signal to perform a corresponding action.

6. The pressure sensing array according to claim 2, wherein the first electrode blocks occupy more area than the second electrode blocks, and the third electrode block occupies more area than the second electrode blocks.

7. The pressure sensing array according to claim 1, wherein the at least one of the pressure sensing units further comprises:
   a common electrode block, spaced from the first electrode blocks and the second electrode blocks by a distance along a third axis, wherein the common electrode block remains electrically isolated from the first electrode blocks and the second electrode blocks; and
   a flexible insulation layer, disposed between the first electrode blocks and the common electrode block and between the second electrode blocks and the common electrode block.

8. A pressure sensing method, applicable to a pressure sensing array, wherein the pressure sensing array comprises a plurality of pressure sensing units and operates in one of a first mode, a second mode, and a third mode, wherein at least one of the pressure sensing units comprises a plurality of first electrode blocks and a plurality of second electrode blocks, the plurality of second electrode blocks and the plurality of first electrode blocks are arranged by staggering along a first axis and a second axis, and the pressure sensing method comprises:
   operating the pressure sensing array in a first mode, comprising:
      recording a first operating state of the first electrode blocks and a second operating state of the second electrode blocks of the at least one of the pressure sensing units; when the pressure sensing array operates in a first mode;

detecting a pressing state of the at least one of the pressure sensing units;

generating a correct signal when the first operating state, the second operating state, and the pressing state of the at least one of the pressure sensing units satisfy a first default set of values while at least one of the first operating state and the second operating state of the at least one of the pressure sensing units is turned on;

reading the correct signal; and performing an unlocking action.

9. The pressure sensing method according to claim 8, wherein the at least one of the pressure sensing units further comprises a third electrode block, wherein the third electrode block surrounds the second electrode blocks and isolates the first electrode blocks from the second electrode blocks, and the pressure sensing method further comprises:

operating the pressure sensing array in the second mode, comprising:

recording the first operating state of the first electrode blocks, the second operating state of the second electrode blocks, and a third operating state of the third electrode block of the at least one of the pressure sensing units;

detecting the pressing state of the at least one of the pressure sensing units; and generating a correct signal when the first operating state, the second operating state, the third operating state, and the pressing state of the at least one of the pressure sensing units satisfy a second set of default values while at least one of the first operating state, the second operating state, and the third operating state of the at least one of the pressure sensing units is turned on.

10. The pressure sensing method according to claim 9, further comprising:

operating the pressure sensing array in the third mode, comprising:

receiving a first logic signal;

turning on the first electrode blocks of the at least one of the pressure sensing units according to the first logic signal;

receiving a plurality of first sensing signals generated by the first electrode blocks, and generating a calculation result signal according to the first sensing signals while the first sensing signals indicate whether the first electrode blocks are pressed; and reading the calculation result signal to perform a corresponding action.

11. The pressure sensing method according to claim 10, further comprising:

generating at least one of a first system signal, a second system signal, and a third system signal; and generating at least one of the first logic signal, the second logic signal, and the third logic signal in responding to at least one of the first system signal, the second system signal, and the third system signal.

12. The pressure sensing method according to claim 9, further comprising:

operating the pressure sensing array in the third mode, comprising:

receiving a second logic signal;

turning on the second electrode blocks of the at least one of the pressure sensing units according to the second logic signal;

receiving a plurality of second sensing signals generated by the second electrode blocks, and generating a calculation result signal according to the second sensing signals while the second sensing signals indicate a plurality of pressing stages of the second electrode block; and reading the calculation result signal to perform a corresponding action.

13. The pressure sensing method according to claim 12, further comprising:

generating at least one of a first system signal, a second system signal, and a third system signal; and generating at least one of the first logic signal, the second logic signal, and the third logic signal in responding to at least one of the first system signal, the second system signal, and the third system signal.

14. The pressure sensing method according to claim 9, further comprising:

operating the pressure sensing array in the third mode, comprising:

receiving a first logic signal;

turning on the third electrode blocks of the at least one of the pressure sensing units according to the third logic signal;

receiving a plurality of third sensing signals generated by the third electrode blocks;

generating a calculation result signal according to the third sensing signals while the third sensing signals indicate whether the third electrode blocks are pressed; and performing a corresponding action in response to the calculation result signal.

15. The pressure sensing method according to claim 14, further comprising:

generating at least one of a first system signal, a second system signal, and a third system signal; and generating at least one of the first logic signal, the second logic signal, and the third logic signal in responding to at least one of the first system signal, the second system signal, and the third system signal.

* * * * *